(12) United States Patent
Jin et al.

(10) Patent No.: US 8,422,684 B2
(45) Date of Patent: Apr. 16, 2013

(54) SECURITY CLASSES IN A MEDIA KEY BLOCK

(75) Inventors: Hongxia Jin, San Jose, CA (US); Jeffrey Bruce Lotspiech, Henderson, NV (US)

(73) Assignee: International Business Machines Corporation, Armonk, NY (US)

( * ) Notice: Subject to any disclaimer, the term of this patent is extended or adjusted under 35 U.S.C. 154(b) by 892 days.

(21) Appl. No.: 12/192,962

(22) Filed: Aug. 15, 2008

(65) Prior Publication Data

US 2010/0040231 A1    Feb. 18, 2010

(51) Int. Cl.
*H04L 9/00* (2006.01)

(52) U.S. Cl.
USPC ............................................. 380/277; 380/45

(58) Field of Classification Search ................... 380/277, 380/45
See application file for complete search history.

(56) References Cited

U.S. PATENT DOCUMENTS

| | | |
|---|---|---|
| 4,041,249 A | 8/1977 | Matz et al. |
| 4,634,807 A | 1/1987 | Chorley et al. |
| 4,694,491 A | 9/1987 | Horne et al. |
| 4,864,616 A | 9/1989 | Pond et al. |
| 5,058,162 A | 10/1991 | Santon et al. |
| 5,065,429 A | 11/1991 | Lang |
| 5,081,677 A | 1/1992 | Green et al. |
| 5,177,791 A | 1/1993 | Yeh et al. |
| 5,247,497 A | 9/1993 | Cohn |
| 5,272,752 A | 12/1993 | Myers et al. |
| 5,345,505 A | 9/1994 | Pires |
| 5,412,723 A | 5/1995 | Canetti et al. |
| 5,592,552 A | 1/1997 | Fiat |
| 5,598,470 A | 1/1997 | Cooper et al. |
| 5,636,276 A | 6/1997 | Brugger |
| 5,651,064 A | 7/1997 | Newell |
| 5,668,873 A | 9/1997 | Yamauchi |
| 5,680,457 A | 10/1997 | Bestler et al. |

(Continued)

FOREIGN PATENT DOCUMENTS

| | | |
|---|---|---|
| WO | WO 99/19822 | 4/1999 |
| WO | WO 00/48190 | 8/2000 |
| WO | WO 01/22406 | 3/2001 |

OTHER PUBLICATIONS

U.S. Appl. No. 12/131,073, filed May 31, 2008, Bellwood et al.
U.S. Appl. No. 12/131,074, filed May 31, 2008, Lotspiech.

(Continued)

*Primary Examiner* — Jung Kim
*Assistant Examiner* — Thomas Ho
(74) *Attorney, Agent, or Firm* — Donald L. Wenskay; Mohammed Kashef

(57) ABSTRACT

According to one embodiment of the present invention, a method for broadcast encryption with security classes in a media key block is provided. In one embodiment the method includes receiving encrypted media of a first and a second class, where the media includes a common media key block, in a device of a first class and in a device of a second class. A first media key is calculated from the common media key block in the device of a first class. A first media key precursor is calculated from the common media key block in the device of a second class. The first media precursor may be used to decrypt media of a first class. The first media precursor may also be used to calculate a second media key in the device of a second class to decrypt content of a first class.

14 Claims, 6 Drawing Sheets

U.S. PATENT DOCUMENTS

| | | | |
|---|---|---|---|
| 5,708,632 | A | 1/1998 | Totsuka et al. |
| 5,734,719 | A | 3/1998 | Tsevdos et al. |
| 5,754,648 | A | 5/1998 | Ryan et al. |
| 5,754,649 | A | 5/1998 | Hasebe et al. |
| 5,796,824 | A | 8/1998 | Hasebe et al. |
| 5,910,987 | A | 6/1999 | Ginter et al. |
| 5,949,885 | A | 9/1999 | Leighton |
| 6,020,833 | A | 2/2000 | Herz et al. |
| 6,061,451 | A | 5/2000 | Muratani et al. |
| 6,118,873 | A | 9/2000 | Lotspiech |
| 6,134,201 | A | 10/2000 | Sako et al. |
| 6,209,092 | B1 | 3/2001 | Linnartz |
| 6,285,774 | B1 | 9/2001 | Schumann et al. |
| 6,289,455 | B1 | 9/2001 | Kocher et al. |
| 6,347,846 | B1 | 2/2002 | Nakamura |
| 6,370,272 | B1 | 4/2002 | Shimizu |
| 6,381,367 | B1 | 4/2002 | Ryan |
| 6,434,535 | B1 | 8/2002 | Kupka et al. |
| 6,442,108 | B1 | 8/2002 | Kurihara et al. |
| 6,442,626 | B1 | 8/2002 | Smola et al. |
| 6,535,858 | B1 | 3/2003 | Blaukovitsch et al. |
| 6,556,679 | B1 | 4/2003 | Kato et al. |
| 6,563,937 | B1 | 5/2003 | Wendt |
| 6,587,949 | B1 | 7/2003 | Steinberg |
| 6,604,072 | B2 | 8/2003 | Pitman et al. |
| 6,609,116 | B1 | 8/2003 | Lotspiech |
| 6,636,966 | B1 | 10/2003 | Lee et al. |
| 6,738,878 | B2 | 5/2004 | Ripley et al. |
| 6,760,445 | B1 | 7/2004 | Schwenk et al. |
| 6,760,539 | B2 | 7/2004 | Asada et al. |
| 6,775,779 | B1 | 8/2004 | England et al. |
| 6,802,003 | B1 | 10/2004 | Gross et al. |
| 6,832,319 | B1 | 12/2004 | Bell et al. |
| 6,839,436 | B1 | 1/2005 | Garay et al. |
| 6,856,997 | B2 | 2/2005 | Lee et al. |
| 6,857,076 | B1 | 2/2005 | Klein |
| 6,888,944 | B2 | 5/2005 | Lotspiech et al. |
| 6,901,548 | B2 | 5/2005 | Hattori et al. |
| 6,912,634 | B2 | 6/2005 | Ripley et al. |
| 6,947,563 | B2 | 9/2005 | Fagin et al. |
| 6,993,135 | B2 * | 1/2006 | Ishibashi ............... 380/277 |
| 6,999,947 | B2 | 2/2006 | Utsumi et al. |
| 7,007,162 | B1 * | 2/2006 | Lotspiech ............... 713/151 |
| 7,010,125 | B2 | 3/2006 | Lotspiech et al. |
| 7,036,024 | B2 | 4/2006 | Watson |
| 7,039,803 | B2 | 5/2006 | Lotspiech et al. |
| 7,046,808 | B1 | 5/2006 | Petrovic et al. |
| 7,057,993 | B2 | 6/2006 | Barnard et al. |
| 7,082,537 | B2 | 7/2006 | Muratani |
| 7,120,901 | B2 | 10/2006 | Ferri et al. |
| 7,155,591 | B2 | 12/2006 | Ripley et al. |
| 7,162,646 | B2 | 1/2007 | Wu et al. |
| 7,215,629 | B2 | 5/2007 | Eppler |
| 7,260,834 | B1 * | 8/2007 | Carlson ............... 726/4 |
| 7,283,633 | B2 | 10/2007 | Asano et al. |
| 7,296,159 | B2 | 11/2007 | Zhang et al. |
| 7,305,711 | B2 * | 12/2007 | Ellison et al. ............... 726/29 |
| 7,319,752 | B2 | 1/2008 | Asano et al. |
| 7,346,169 | B2 | 3/2008 | Asano et al. |
| 7,380,132 | B2 | 5/2008 | Sako et al. |
| 7,380,137 | B2 | 5/2008 | Bell et al. |
| 7,392,392 | B2 | 6/2008 | Levy |
| 7,502,933 | B2 * | 3/2009 | Jakobsson et al. ............ 713/172 |
| 7,555,129 | B2 * | 6/2009 | Yamamoto et al. ........... 380/277 |
| 7,590,238 | B2 * | 9/2009 | Kamijoh et al. ................ 380/45 |
| 2002/0003881 | A1 | 1/2002 | Reitmeier et al. |
| 2002/0044320 | A1 | 4/2002 | Pfeiffer et al. |
| 2002/0104001 | A1 | 8/2002 | Lotspiech et al. |
| 2002/0141582 | A1 | 10/2002 | Kocher et al. |
| 2003/0070083 | A1 | 4/2003 | Nessler |
| 2003/0169885 | A1 | 9/2003 | Rinaldi |
| 2003/0220921 | A1 | 11/2003 | Fagin et al. |
| 2004/0034787 | A1 | 2/2004 | Kitani |
| 2004/0098593 | A1 | 5/2004 | Muratani |
| 2004/0111611 | A1 | 6/2004 | Jin et al. |
| 2004/0128259 | A1 | 7/2004 | Blakeley et al. |
| 2004/0133794 | A1 | 7/2004 | Kochner et al. |
| 2004/0153941 | A1 | 8/2004 | Muratani |
| 2005/0021568 | A1 | 1/2005 | Pelly |
| 2005/0097110 | A1 | 5/2005 | Nishanov et al. |
| 2005/0141704 | A1 | 6/2005 | Van Der Veen |
| 2005/0283610 | A1 | 12/2005 | Metios et al. |
| 2006/0056695 | A1 | 3/2006 | Wu et al. |
| 2006/0085343 | A1 | 4/2006 | Lisanke et al. |
| 2006/0136728 | A1 | 6/2006 | Gentry et al. |
| 2006/0239503 | A1 | 10/2006 | Petrovic et al. |
| 2006/0282676 | A1 | 12/2006 | Serret-Avila et al. |
| 2007/0067242 | A1 | 3/2007 | Lotspiech et al. |
| 2007/0067244 | A1 | 3/2007 | Jin et al. |
| 2007/0165853 | A1 | 7/2007 | Jin et al. |
| 2007/0174637 | A1 | 7/2007 | Lotspiech et al. |

OTHER PUBLICATIONS

U.S. Appl. No. 12/131,076, filed May 31, 2008, Jin et al.
U.S. Appl. No. 12/143,061, filed Jun. 20, 2008, Jin et al.
U.S. Appl. No. 12/143,658, filed Jun. 20, 2008, Jin et al.
U.S. Appl. No. 12/192,962, filed Aug. 15, 2008, Jin et al.
Celik et al., "Collusion-resilient fingerprinting using random prewarping," Image Processing, 2003, ICIP 2003, Proceedings, 2003 International Conference vol. 1, Sep. 14-17, 2003 pp. I-509-12, vol. 1.
Deguillaume et al., "Countermeasures for unintentional and intentional video watermarking attacks," Conference SPIE—Int. Soc. Opt. Eng. (USA), Jan. 24-26, 2000, vol. 3971, p. 346-357.
Fernandez-Munoz et al., "Fingerprinting schemes for the protection of multimedia distribution rights," Upgrade, Security in e-Commerce, v. III, n. 6, pp. 36-40, Dec. 2002, http://www.cepis-upgrade.org/issues/2002/6/upgrade-vIII-6.pdf.
Hagiwara et al., "A short random fingerprinting code against a small number of pirates" Applied Algebra, Algebraic Algorithms and Error-Correcting Codes, 16th International Symposium, AAEECC-16. Proceedings (Lecture Notes in Computer Science vol. 3857) pp. 193-202 (Feb. 2-24, 2006).
Seol et al., "A scalable fingerprinting scheme for tracing traitors/colluders in large scale contents distribution environments," Intelligent Systems Design and Applications, 2005. ISDA 2005, Proceedings, 5th International Conference Sep. 8-10, 2005 pp. 228-223.

\* cited by examiner

SECURITY CLASSES IN A MEDIA KEY BLOCK

BACKGROUND

The present invention relates to content protection, and more specifically, to media key blocks in broadcast encryption systems.

Broadcast encryption is an important cryptographic key management approach, especially useful in content protection systems. Two popular broadcast-encryption-based systems are the Content Protection for Recordable Media (CPRM) system from IBM, Intel, Panasonic, and Toshiba, and the Advanced Access Content System (AACS) from Disney, IBM, Intel, Microsoft, Panasonic, Sony, Toshiba, and Warner Bros.

A media key block is the fundamental structure in broadcast-encryption-based system. This structure is also sometimes called a session key block. A media key block is a data structure which is processed by a device using a set of device keys. The result of the processing allows the device to calculate a media key. The media key, in turn, is used to decrypt a message. In content protection systems, these "messages" are actually content like video or music. Often in a content protection system, each piece of content is associated with a different media key block.

In some cases, the media key block is associated with a set of devices, not a particular item of content. One such example is IBM's Advanced Secure Content Cluster Technology (ASCCT), in which all the content that devices can access is protected by a single media key block. This feature is useful, for example, in case where a consumer might have a library of entertainment content in his home, and wants that library to be freely viewed by all the devices he owns. It should be noted that in this single media key block, it is often the case that not all the content being protected is equally valuable. For example, the user might have some movies in standard definition and some movies in high definition. From the point of view of the movies' creators, the high definition version is more valuable, and would have more serious economic consequences if the users were to make unlimited unauthorized copies. Likewise, not all devices are equally privileged. There is no reason, for example, why a standard definition television needs a set of keys that allows it to decrypt high-definition video.

SUMMARY

According to one embodiment of the present invention, a method comprises: receiving a common media key block in a device of a first class and in a device of a second class; calculating a first media key from the common media key block in the device of a first class; calculating a first media key precursor from the common media key block in the device of a second class; and calculating a second media key from the first media key precursor in the device of a second class.

According to another embodiment of the present invention, a method comprises: receiving encrypted media of a first class in a device of the first class, the encrypted media of a first class including a common media key block; receiving encrypted media of a second class in a device of the second class, the encrypted media of a second class including the common media key block; calculating a first media key from the common media key block in the device of a first class; calculating a first media key precursor from the common media key block in the device of a second class; decrypting the encrypted media of a first class using the first media key; and decrypting the encrypted media of a second class using the first media key precursor.

According to a further embodiment of the present invention, a system comprises: a common media key block; a plurality of devices, each receiving the common media key block, the plurality of devices including a device belonging to a first class and a device belonging to a second class; the device belonging to a first class including means for generating a first media key from the common media key block, the first media key corresponding to the first class; and the device belonging to a second class including means for calculating a first media key precursor using the common media key block, and means for calculating a second media key from the first media key precursor.

According to another embodiment of the present invention, a computer program product for broadcast encryption comprises: a computer usable medium having computer usable program code embodied therewith, the computer usable program code comprising: computer usable program code configured to: receive a common media key block in a device of a first class and in a device of a second class; calculate a first media key from the common media key block in the device of a first class; calculate a first media key precursor from the common media key block in the device of a second class; and calculate a second media key from the first media key precursor in the device of a second class.

DETAILED DESCRIPTION

Figure 1:
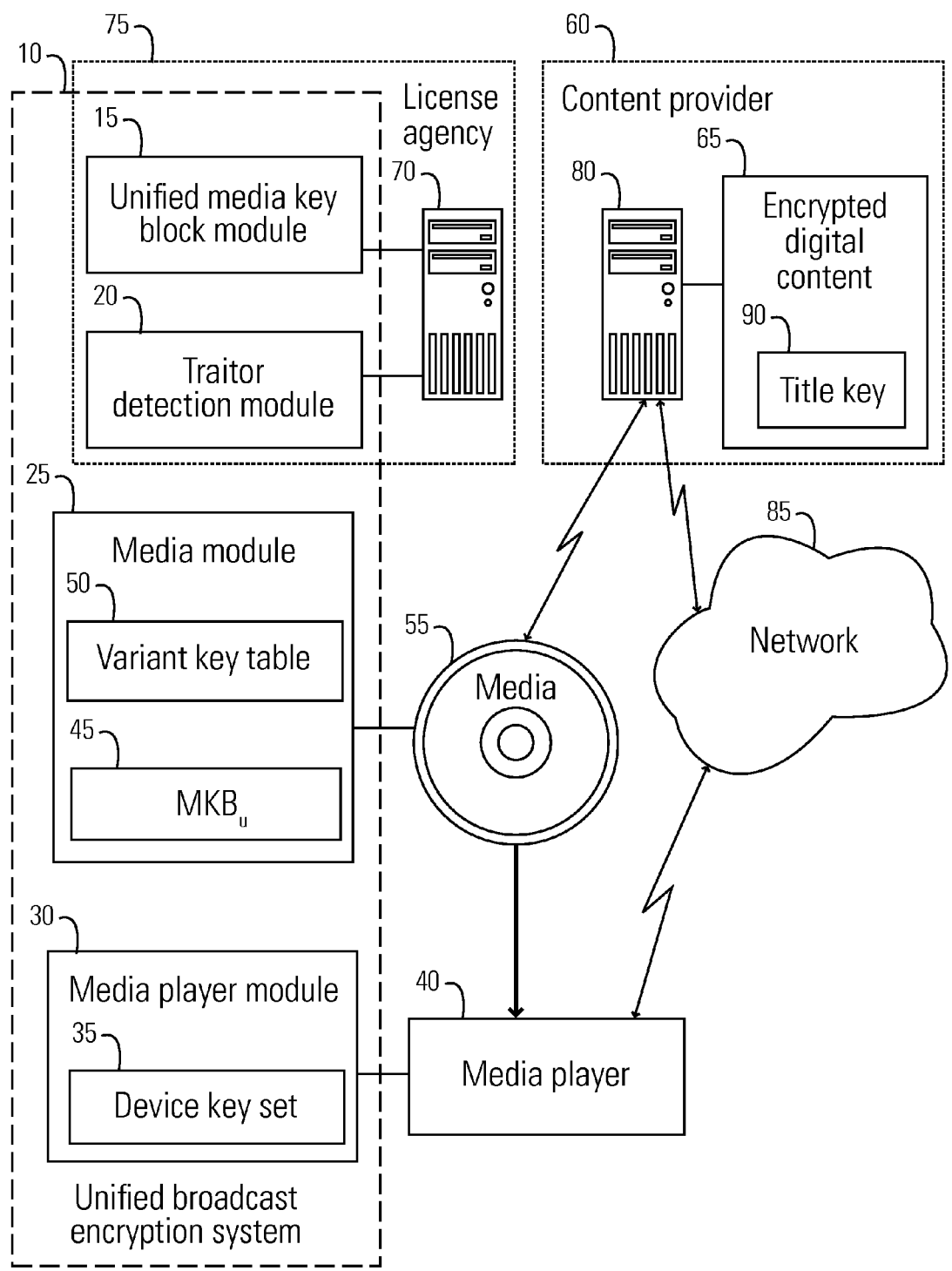
FIG. 1 shows a diagram of a broadcast encryption system in accordance with an embodiment of the invention.

Embodiments of the invention provides a broadcast encryption system having a single media key block in which all devices are not equally protected and all devices are not equally privileged. In contrast, in prior single-media-key-block systems, such as ASCCT, all content was equally protected, and all devices are equally privileged, by virtue of the fact that all devices process the same media key block and learn the same media key.

It may be noted that in order to provide different levels of protection and privilege to different devices, one approach might be to employ multiple media key blocks, one for each class of content. The problem with this approach is that the devices do need a common media key block for other reasons. For example, a common media key block is useful to securely form the cluster. A cluster might be, for example, a set of devices connected to a private network in a consumer's home. It is important to the content owners that all the devices in the network be compliant; in other words, all devices follow the same rules in protected content. Therefore, it is important that all the devices can calculate a common cryptographic key, so that each can verify that the others are compliant. (Non-compliant devices would be revoked in the media key block and would be unable to calculate the common key.)

Also, a common media key block is needed to enable the devices to remain in synchronization when new media key blocks revoke newly discovered circumvention devices. A cluster contains not just a common media key block, but also other data files, in particular the list of the authorized devices in the cluster. This authorization list must be cryptographically "signed" by the common key(s) in the cluster. Obviously, if there is more than one key in use in the cluster, synchronizing the signing when the new media key block is delivered is much more complicated.

Thus, having multiple media key blocks, although theoretically possible, would greatly complicate the synchronization process. The present invention retains a single media key block, with its straightforward synchronization, while still allowing different classes of devices to learn different keys from the same media key block.

Embodiments of the present invention accomplish this by using a one-way cryptographic function to define a hierarchy of keys. The highest security class devices initially calculate a media key precursor instead of a media key from their processing of the media key block. Then, these devices can execute a previously-defined one-way function on this precursor. The result is either the media key, or another precursor, if there are more than two security classes in the system. Likewise, executing the one-way function on that second precursor can produce another precursor. This chain of one-way functions can be defined to any depth, allowing a single system to have any number of security classes. The last one-way function in the chain yields the media key. The precursors then become keys that can be used to protect content.

In the example described above, where some devices in a home are high-definition and some are standard-definition, the immediate precursor of the media key may be used to protect the high definition content, and the media key itself may be used to protect the standard definition content.

Note that the high definition devices that calculate the precursor key from the media key block are also able to calculate the media key itself by using the one-way function. Thus, they can decrypt standard definition content, and, perhaps more importantly, have a key they can use to synchronize cryptographically with the standard definition devices. This is how the present invention provides the desired synchronization functionality.

Referring now to FIG. 1 there is shown an exemplary overall environment in which a system 10, for performing broadcast encryption for digital content according to the present invention may be used. In this embodiment, the present invention may be used in a variety of content protection applications including but not limited to DVDs, downloaded content, software and others. FIG. 1 shows the system 10 for performing broadcast encryption as disclosed in U.S. patent application Ser. No. 12/133,736 entitled "System, Method, and Service for Performing Unified Broadcast Encryption and Traitor Tracing for Digital Content", the contents of which are incorporated herein by reference.

System 10 comprises a unified media key block module 15, a traitor detection module 20, a media module 25, and a media player module 30. The media player module 30 comprises a device key set 35 that is uniquely associated with a media player 40. The media player 40 may comprise any one of a number of devices used to play digital media, including, but not limited to DVD players, personal computers, movie rental boxes which are allowed to play a move for a limited period of time, and others. The media player module 30 further comprises a software programming code or a computer program product that is typically embedded within, or installed on the media player 40.

The media module 25 comprises a unified media key block 45 (interchangeably reference herein as MKBu 45) and a variant key table 50. The unified media key block 45 comprises a subset of available device keys and a data part in which each of the subset of device keys individually encrypts a set of media key variants. For example, the subset of device keys may be organized in a tree structure, such as in the subset-difference broadcast encryption scheme, although all broadcast encryption schemes are within the scope of this invention. The media module 25 comprises a software programming code or a computer program product that is saved onto a media 55.

The unified media key block module 15 generates one or more unified media key blocks for use by a content provider 60 to place on the media 55 together with an encrypted digital content 65 (interchangeably referenced herein as encrypted content 65). The unified media key block module 15 comprises a software programming code or a computer program product that is typically embedded within, or installed on a server 70 that belongs to a separate facility, for example, a license agency 75. Alternatively, system 10 can be saved on a suitable memory or storage medium such as a diskette, a CD, a DVD, a hard drive, or like devices.

The traitor detection module 20 identifies the device keys that have been compromised by a traitor or have been pirated. The traitor detection module 20 passes the identified device keys to the unified media key block module 15 to revoke those identified device keys from any future unified media key blocks, preventing further piracy by that traitor or attacker. The traitor detection module 20 comprises a software programming code or computer program product that is shown, for illustration purposes only, as embedded within, or installed on server 70 of the license agency 75. Alternatively, the traitor detection module 20 may be installed in a separate facility other than the one that issues unified media key blocks to content providers.

The media player 40 can access a server 80 of the content provider 60 through a network 85 to obtain the encrypted digital content 65 and a title key 90. The title key 90 (interchangeably referenced herein as Kt 90) allows the media player 40 to decrypt and play the encrypted content 65 after the encrypted content 65 has been recorded to media 55. The title key 90 is encrypted, and requires the media player 40 to correctly process the unified media key block 45 to decrypt and use the unified media key block 45. The content provider 60 may record the encrypted content 65 and the encrypted title key 90 directly to the media 55 such as, for example, a CD or DVD. A user may then obtain the encrypted content 65 by, for example, purchasing the CD.

The media player 40 comprises any compliant module that can verify the physical presence of a media 55 such as, for example, a disk. A compliant module is one that follows the usage rules of the media module 25 that are cryptographically bound to media 55. For example, a compliant recorder does not record content encoded "do not copy".

FIG. 1 illustrates an exemplary application of system 10 referenced as "electronic sell-through" in which a consumer obtains the encrypted content 65 by downloading the encrypted content 65 from the content provider 60 onto a media 55 such as recordable disk in the home of the consumer. While described in terms of an "electronic sell-through" application, it should be clear that system 10 is applicable as well to, for example, any application in which authentication is important and the authenticators are restricted to a subset of the participants. Furthermore, while illustrated as providing secure encryption of content for delivery to media, it should be clear that system 10 is applicable as well to, for example, any type of content delivery. Also, while the system 10 shown in FIG. 1 is a unified broadcast encryption system, embodiments of the invention may be used with other types of broadcast encryption systems.

Figure 2:
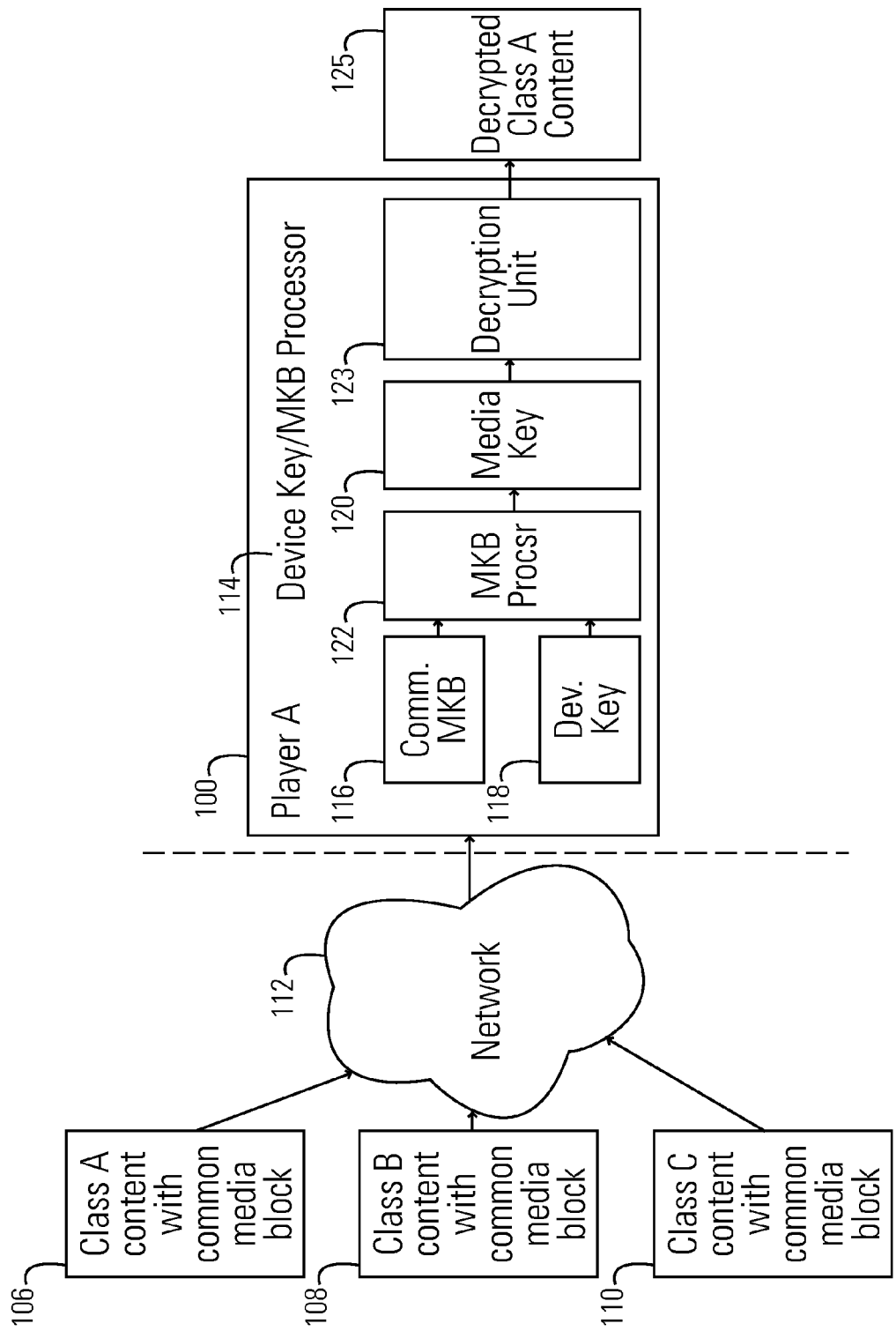
FIG. 2 shows a diagram of a content player of a first security class in accordance with an embodiment of the invention.
Figure 3:
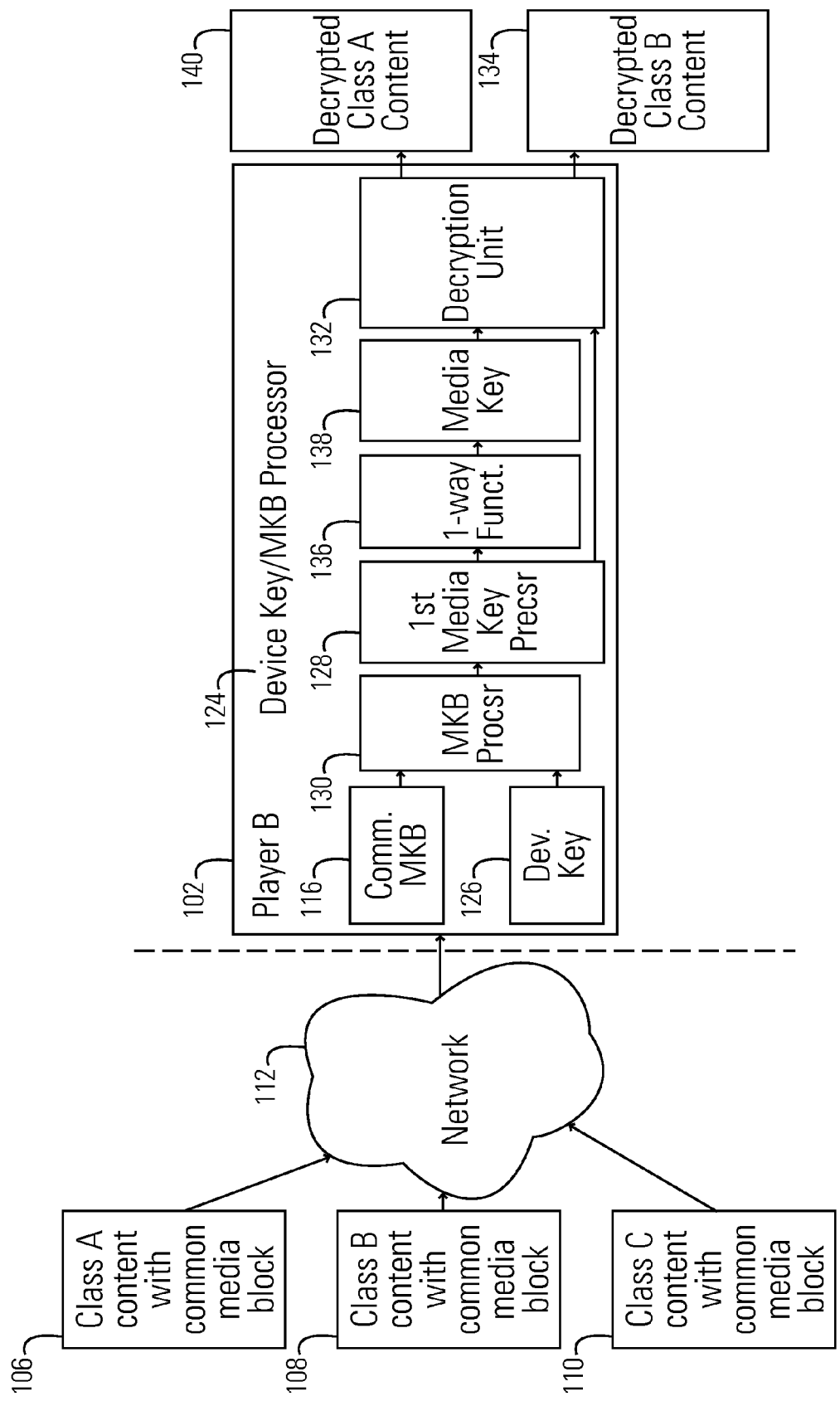
FIG. 3 shows a diagram of a content player of a second security class in accordance with an embodiment of the invention.
Figure 4:
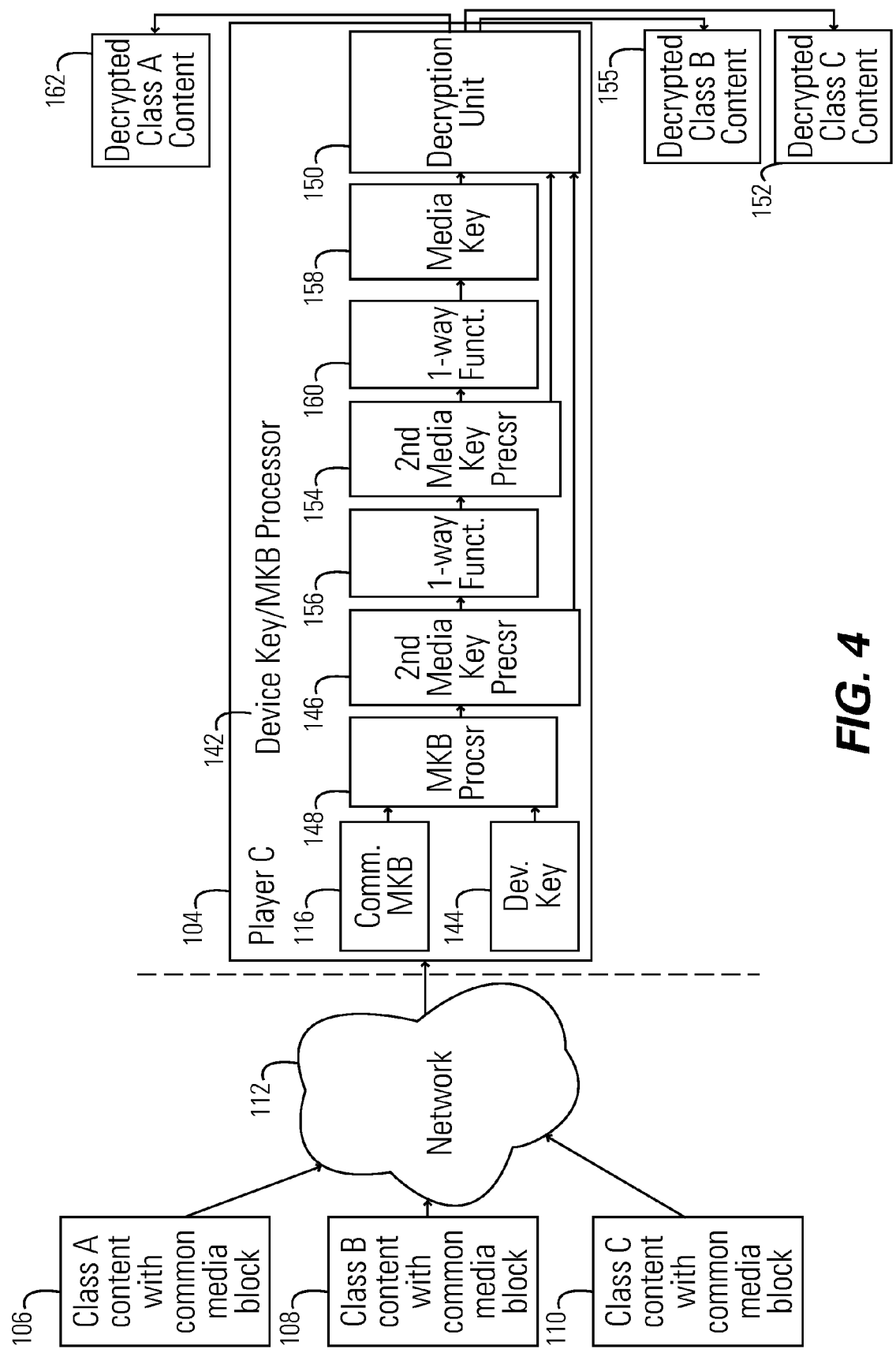
FIG. 4 shows a diagram of a content player of a third security class in accordance with an embodiment of the invention.

FIGS. 2, 3 and 4 shows block diagrams of a plurality of media players, such as media player 40 shown in FIG. 1. In particular, media players 100, 102 and 104 are configured to play different classes of media. Content of three classes are shown in FIGS. 2, 3 and 4. In particular, the content includes encrypted content of class A 106, encrypted content of class B 108, and encrypted content of class C 110. In accordance with an embodiment of the invention, each of the classes of content contains a common media key block (MKB) 116.

In this embodiment, class A content 106 requires the least amount of security, class B content 108 requires a higher level of security, and Class C requires the highest level of security. Media player 100 is configured to play only class A content 106. Media player 102 is configured to play class A content 106 and class B content 108. Media player 110 is configured to play class A content 106, class B content 108 and class C content 110. For example, Class A content may be standard definition content, Class B may be high definition content, and Class C may be content requiring even higher level of security than high-definition content.

The three classes of content are received by the media players 100, 102 and 104 through a network 112, which may comprise one or more of a variety of known ways of distributing digital content. Referring now to FIG. 2, media player 100 receives encrypted class A content 106 and processes is using a device key/MKB processor 114. In particular, device key/MKB processor 114 extracts the common MKB 116 from the class A content 106 and uses its device key 118 to calculate a media key 120. This calculation is accomplished using standard MKB processing 122. The details of the processing depend on the particular MKB scheme in use in the system; for example, the system might be using the well-known "subset-difference" MKB scheme such as is used in AACS. All MKB schemes are within the scope of this invention. The calculated media key 120 then is used by a decryption unit 123 to produce decrypted Class A digital content 125.

Referring now to FIG. 3, media player 102 receives class B encrypted digital content 108 and its device key/MKB processor 124 extracts the common MKB 116. The device key/MKB processor 124 then uses its device key 126 and the common MKB 116 to calculate a first media key precursor 128 using standard MKB processing 130. The first media key precursor 128 may then be used by a decryption unit 132 to decrypt the class B content 108 and output decrypted class B content 134.

Media player 102 also has the ability to process class A content 106. It does this by processing the encrypted class A content 106 to produce the first media key precursor 128 and then uses a one-way function 136 to calculate a media key 138. Decryption unit 132 may then use the media key 138 to output decrypted class A content 140.

Referring now to FIG. 4, media player 104 receives encrypted class C content 110 and its device key/MKB processor 142 extracts the common MKB 116. The device key/MKB processor 142 then uses its device key 144 and the common MKB 116 to calculate a second media key precursor 146 using a standard MKB process 148. The second media key precursor 146 may then be used by a decryption unit 150 to decrypt the class C content 108 and output decrypted class C content 152.

Media player 104 may also process class B content by calculating a first media key precursor 154 from the second media key precursor 146 using a one-way function 156. This first media key precursor 154 may then be used by the decryption unit 150 to output decrypted class B content 155. Likewise, media player 104 may also process class A content 106 by calculating a media key 158 from the first media key precursor 154 using a one-way function 160. This media key 158 may then be used by the decryption unit 150 to output decrypted class A content 162.

Figure 5:
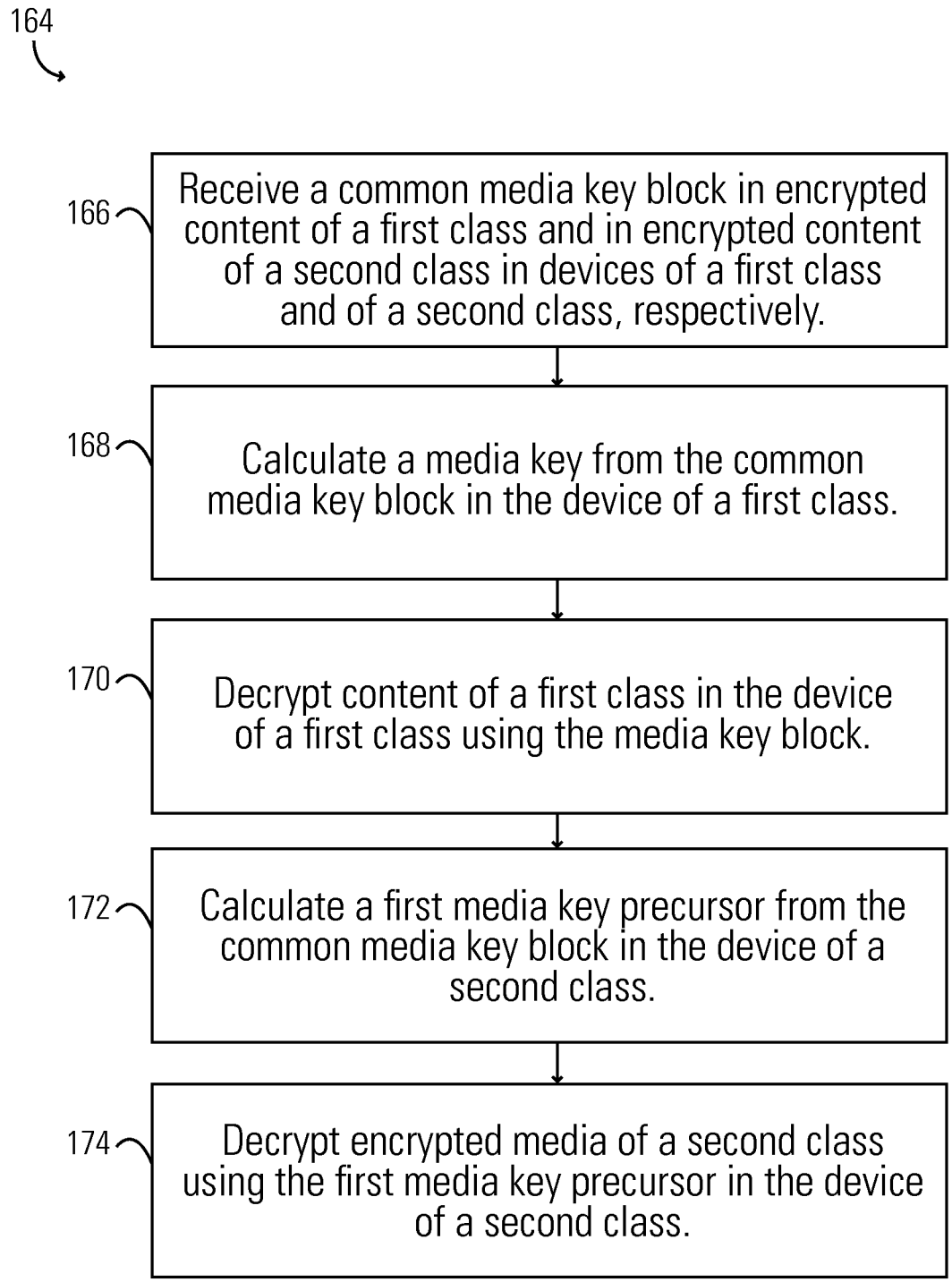
FIG. 5 shows a flow chart of a broadcast encryption method in accordance with an embodiment of the invention.

FIG. 5 shows a flow chart of a process 164 for broadcast encryption in accordance with an embodiment of the invention. In process 164, a system having two security classes is described. It will be appreciated that this process 164 may be modified to handle any number of security classes by adding additional media key precursors. In step 166 a common media key block is received by a device of a first class and by a device of a second class, which may comprise players 100 and 102 shown in FIGS. 2 and 3. The common media key block will be received as part of digital content, which may include digital content of a first class and digital content of a second class. The digital content of a first class has lower level security requirements than the digital content of a second class. For example, the first class content may be standard television broadcast video, and the second class content may be high definition television broadcast video. In step 168, the device of a first class calculates a media key using the common media key block. This media key may then be used by the device of a first class to decrypt encrypted content of a first class, in step 170.

The device of a second class calculates a first media key precursor using the common media key block, in step 172. This media key precursor may then be used by the second class device to decrypt encrypted content of a second class, in step 174. As described above, the second class device may also calculate a media key from the media key precursor to decrypt content of a first class.

It may be noted that the licensing agency 75, as shown in FIG. 1, may generate media key blocks where some devices calculate media key precursors, and other devices calculate the media key. This is a relatively simple thing to do because all broadcast encryption schemes work by assigning devices to various overlapping subsets. Each subset has an associated key. The media key block is simply a list of subsets of non-revoked devices along with the encryptions of the media key with each subset key. It is a simple matter for different subsets to have encryptions of different keys instead of every one having an encryption of the media key. In addition, the licensing agency needs to group devices in the same security class into convenient subsets when they assign device keys. It will be appreciated by those skilled in the art that the present invention works equally well for all known broadcast encryption schemes.

Embodiments of the invention may utilize a variety of known one-way functions. In one embodiment, the following well-known one-way function, based on the Advanced Encryption Standard (AES) cipher, is used:

$$r = AES\text{-}D(k, d) \text{ XOR } d$$

where r is the result, k is a key, d is data, AES-D is AES decryption in electronic code book mode, and XOR is exclusive-or. This function is one-way in the following sense: from r, it is intractable to calculate either k or d. In this embodiment, k would be a media key precursor and d would be a constant known to all devices. Note that d does not have to be a secret. It can be a published constant without hurting the security of this invention.

It will be appreciated by those skilled in the art that the various keys in the media key one-way chain protect the various classes of content. However, in practice, it is rare in content protection systems for keys from the media key block to directly encrypt the content. Instead, there is often at least one a level of indirection: the content is encrypted with a title key, and then the title key is encrypted with the key from the media key block. This encrypted title key is typically stored in a header associated with the content. Hence some embodiments of the invention may employ this technique of using one or more levels of indirection of keys to protect the content.

As can be seen from the above disclosure, embodiments of the invention provide a broadcast encryption system that employs a common media key block, while providing different levels of protection for different media and different devices.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
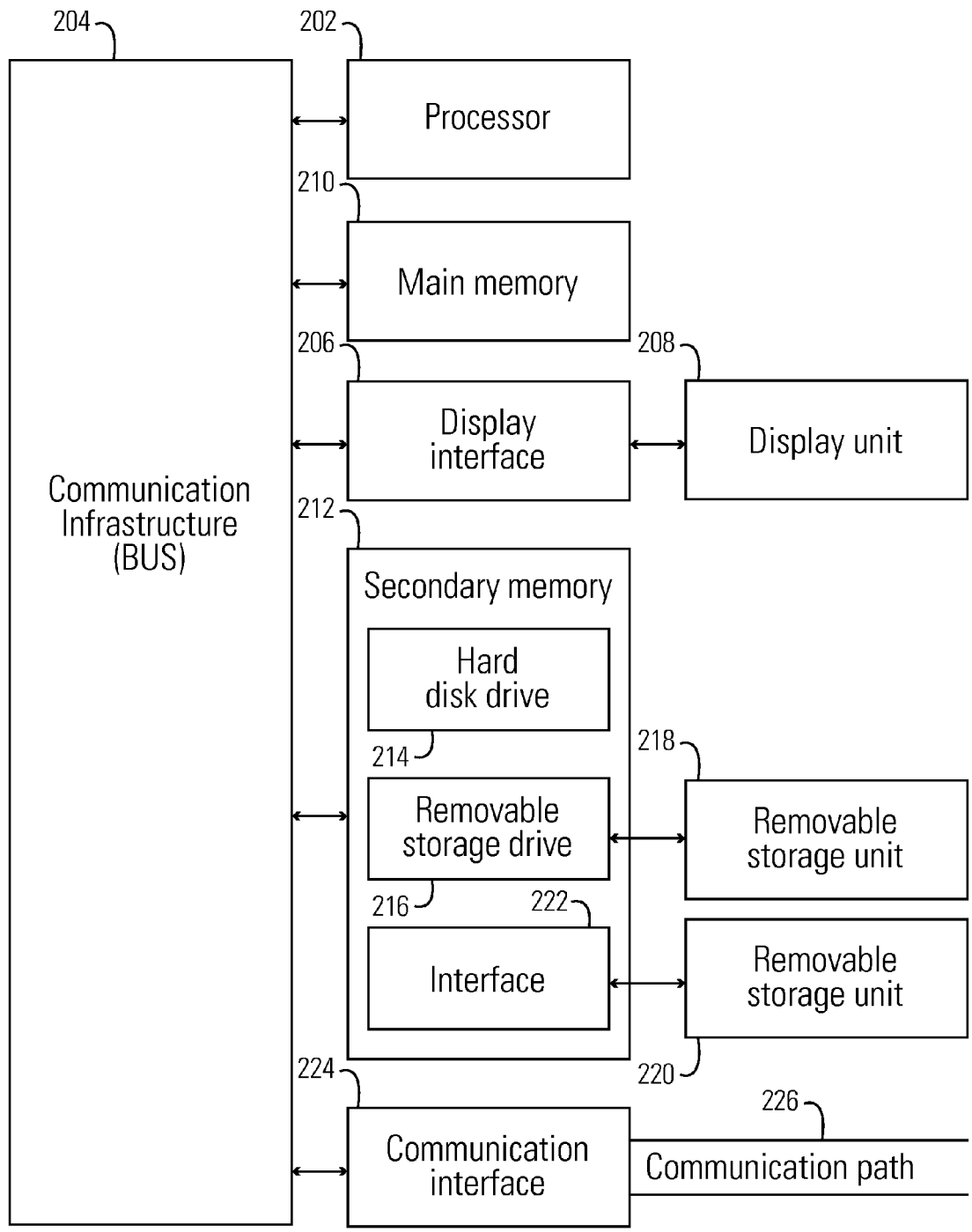
FIG. 6 is a high level block diagram of an information processing system useful for implementing one embodiment of the present invention.

FIG. 6 is a high level block diagram showing an information processing system useful for implementing one embodiment of the present invention. The computer system includes one or more processors, such as processor 202. The processor 202 is connected to a communication infrastructure 204 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 206 that forwards graphics, text, and other data from the communication infrastructure 204 (or from a frame buffer not shown) for display on a display unit 208. The computer system also includes a main memory 210, preferably random access memory (RAM), and may also include a secondary memory 212. The secondary memory 212 may include, for example, a hard disk drive 214 and/or a removable storage drive 216, representing, for example, a floppy disk drive, a magnetic tape drive, or an optical disk drive. The removable storage drive 116 reads from and/or writes to a removable storage unit 218 in a manner well known to those having ordinary skill in the art. Removable storage unit 218 represents, for example, a floppy disk, a compact disc, a magnetic tape, or an optical disk, etc. which is read by and written to by removable storage drive 216. As will be appreciated, the removable storage unit 218 includes a computer readable medium having stored therein computer software and/or data.

In alternative embodiments, the secondary memory 212 may include other similar means for allowing computer programs or other instructions to be loaded into the computer system. Such means may include, for example, a removable storage unit 220 and an interface 222. Examples of such means may include a program cartridge and cartridge interface (such as that found in video game devices), a removable memory chip (such as an EPROM, or PROM) and associated socket, and other removable storage units 220 and interfaces 222 which allow software and data to be transferred from the removable storage unit 220 to the computer system.

The computer system may also include a communications interface 224. Communications interface 224 allows software and data to be transferred between the computer system and external devices. Examples of communications interface 224 may include a modem, a network interface (such as an Ethernet card), a communications port, or a PCMCIA slot and card, etc. Software and data transferred via communications interface 224 are in the form of signals which may be, for example, electronic, electromagnetic, optical, or other signals capable of being received by communications interface 224. These signals are provided to communications interface 224 via a communications path (i.e., channel) 226. This communications path 226 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 210 and secondary memory 212, removable storage drive 216, and a hard disk installed in hard disk drive 214.

Computer programs (also called computer control logic) are stored in main memory 210 and/or secondary memory 212. Computer programs may also be received via communications interface 224. Such computer programs, when executed, enable the computer system to perform the features of the present invention as discussed herein. In particular, the computer programs, when executed, enable the processor 202 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of enforcing a hierarchy of security classes defined in a common media key block, each of said classes being associated with a particular format of media content, and said media key block being commonly used by media devices that play media content formats associated with different security classes, the method comprising:

in response to a request for a media device to decrypt an encrypted media file, said media device plays media content of a highest security class of said hierarchy and security classes lower in said hierarchy than said highest security class, the media file being stored on a storage medium that includes said media key block and at least one media file comprising media content being of a particular format, said device:

reading said media key block;

calculating a first media key precursor by processing said media key block, said first precursor allows said device to decrypt said media file for media content associated with a first security class being of a highest security class of said hierarchy; and if said media file is for media content associated with a second security class being of a second highest security class of said hierarchy: (i) calculating a media key by executing at least one predefined one-way function at least once on said first precursor and (ii) using said media key to decrypt said media file for said media content associated with said second security class.

2. The method of claim 1, further comprising:
if said media file is for media content associated with a third security class being of a third highest security class of said hierarchy:
calculating a second media key precursor by processing said media key block;
calculating a media key by executing at least one predefined one-way function at least once on said second precursor; and
using said media key, calculated from said second precursor, to decrypt said media file for said media content associated with said third security class.

3. The method of claim 2, further comprising:
iteratively repeating said calculating, of a media key precursor and a media key, until a media key is generated that allows said device to decrypt said media file for media content associated with a security class lower than said third security class.

4. The method of claim 1, wherein said media files are encrypted with a title key that is encrypted with a key selected from the group consisting of: said media key, said first precursor, and said second precursor.

5. The method of claim 1, wherein said at least one predefined one-way function comprises:

$$r=\text{AES-}D(k,d)\text{XOR}d$$

where r is said first media key precursor, k is a key, d is a constant known by said media device, AES-D is Advanced Encryption Standard (AES) decryption, and XOR is exclusive-or.

6. A media device of enforcing a hierarchy of security classes defined in a common media key block, each of said classes being associated with a particular format of media content, said media key block being commonly used by media devices that play media content formats associated with different security classes, and said media device plays media content of a highest security class of said hierarchy and security classes lower in said hierarchy than said highest security class said device comprising:
a storage medium that includes said media key block and at least one encrypted media file comprising media content being of a particular format;
a processor executing a program that in response to a request for said device to decrypt said media file:
reads said media key block;
calculates a first media key precursor by said media key block, said first precursor allows said device to decrypt said media file for media content associated with a first security class being of a highest security class of said hierarchy; and
if said media file is for media content associated with a second security class being of a second highest security class of said hierarchy: (i) calculates a media key by executing at least one predefined one-way function at least once on said first precursor, and (ii) uses said media key to decrypt said media file for said media content associated with said second security class.

7. The device of claim 6, further comprising:
if said media file is for media content associated with a third security class being of a third highest security class of said hierarchy, said processor:
calculates a second media key precursor by processing said media key block;
calculates a media key by executing at least one predefined one-way function at least once on said second precursor; and
uses said media key, calculated from said second precursor, to decrypt said media file for said media content associated with said third security class.

8. The device of claim 7, further comprising:
iteratively repeating said calculates, of a media key precursor and a media key, until a media key is generated that allows said device to decrypt said media file for media content associated with a security class lower than said third security class.

9. The device of claim 6, wherein said at least one predefined one-way function comprises:

$$r=\text{AES-}D(k,d)\text{XOR}d$$

where r is said first media key precursor, k is a key, d is a constant known by said media device, AES-D is Advanced Encryption Standard (AES) decryption, and XOR is exclusive-or.

10. A computer program product of enforcing a hierarchy of security classes defined in a common media key block, each of said classes being associated with a particular format of media content, and said media key block being commonly used by media devices that play media content formats associated with different security classes, the computer program product comprising a non-transitory computer-useable storage medium, said medium having a computer-readable program, wherein the program upon being processed on a computer causes the computer to implement the steps of:
in response to a request for a media device to decrypt an encrypted media file, said media device plays media content of a highest security class of said hierarchy and security classes lower in said hierarchy than said highest security class, the media file being stored on a storage medium that includes said media key block and at least one media file comprising media content being of a particular format, said device:
reading said media key block;
calculating a first media key precursor by processing said media key block, said first precursor allows said device to decrypt said media file for media content associated with a first security class being of a highest security class of said hierarchy; and
if said media file is for media content associated with a second security class being of a second highest security class of said hierarchy: (i) calculating a media key by executing at least one predefined one-way function at least once on said first precursor and (ii) using said media key to decrypt said media file for said media content associated with said second security class.

11. The computer program product of claim 10, further comprising:
if said media file is for media content associated with a third security class being of a third highest security class of said hierarchy:
calculating a second media key precursor by processing said media key block;
calculating a media key by executing at least one predefined one-way function at least once on said second precursor; and
using said media key, calculated from said second precursor, to decrypt said media file for said media content associated with said third security class.

12. The computer program product of claim 11, further comprising:
iteratively repeating said calculating, of a media key precursor and a media key, until a media key is generated that allows said device to decrypt said media file for media content associated with a security class lower than said third security class.

13. The computer program product of claim 12, wherein said media files are encrypted with a title key that is encrypted with a key selected from the group consisting of: said media key, said first precursor, and said second precursor.

14. The computer program of claim 10, wherein said at least one predefined one-way function comprises:

$$r = AES\text{-}D(k,d) \text{XOR} d$$

where r is said first media key precursor, k is a key, d is a constant known by said media device, AES-D is Advanced Encryption Standard (AES) decryption, and XOR is exclusive-or.

\* \* \* \* \*